United States Patent Office 3,637,541
Patented Jan. 25, 1972

3,637,541
PROCESS FOR PRODUCING POLYETHER-URETHANE FOAM EMPLOYING POLYOXYALKYLENE-POLYSILOXANE BLOCK POLYMERS AS SURFACTANTS
Gerd Rossmy, Essen-Werden, Germany, assignor to Th. Goldschmidt A.-G., Essen, Germany
No Drawing. Filed Feb. 20, 1969, Ser. No. 801,153
Claims priority, application Germany, Mar. 16, 1968,
P 16 94 366.1
Int. Cl. C07f 7/08; C08g 22/46, 53/08
U.S. Cl. 260—2.5 AH
8 Claims

ABSTRACT OF THE DISCLOSURE

In a foaming process for producing polyurethane foam in which the foaming is performed in the presence of polyoxyalkylene-polysiloxane mixed block polymers, the invention proposes that the polyoxyalkylene block should consist of two separate moieties, of which the first constitutes about 25–70% by weight and has an average molecular weight of about 1600–4000, 20–100% by weight of the block being constituted by ethylene oxide. The second polyoxyalkylene moiety constitutes 30–75% by weight of the block and has an average molecular weight of 400–1200, the ethylene oxide content of the block being between about 65–100% by weight.

DESCRIPTION OF THE INVENTION

The invention relates to a process for the preparation of polyurethane foams from polyethers having on the average at least two hydroxyl groups per molecule and organic diisocyanates in the presence of polyoxyalkylene-polysiloxane mixed block polymers, catalysts, water and/or other propellants.

It is known from numerous publications that certain polyoxyalkylene-polysiloxane mixed block polymers exert a stabilizing influence on polyurethane foam formed in the reaction of polyhydroxy compounds with isocyanates in the presence of catalysts, water and propellants. In such mixed block polymers, the polyoxyalkylene block may be linked to the polysiloxane block for example by an SiOC or an SiC linkage. The preparation of such compounds with SiOC linkage of the blocks has been disclosed in German pats. 1,012,602, 1,040,251 and 1,120,-147, as well as in U.S. Pat. 3,115,512.

The use of such compounds for foam stabilizing purposes is taught in German Auselgeschrift 1,091,324 and 1,109,882, as well as in German Pat. 1,233,133. Analogous literature for the production and use of polyoxyalkylene-polysiloxane mixed block polymers with SiC linkages of the blocks is represented by U.S. Pat. 2,846,453, German Auslegeschrift 1,220,615 and German Auslegeschrift 1,153,166. The abovementioned patents and publications are merely representative since a very large number of patents and published patent applications, as well as publications in the chemical literature are in existence dealing with this subject matter.

Investigations of the manner in which the polyoxyalkylene mixed block polymers act as foam stabilizers have indicated that these compounds have to fulfill a number of different tasks. These tasks are, among others, to nucleate gas bubbles, to emulsify starting materials which are otherwise immisible, to stabilize the rising foam against retraction and to stabilize the foam against coalescence which could lead to cell enlargement. In respect to soft foams, the stabilizer has the additional task to open the cells after a maximum foam height or level has been reached. These individual tasks pose oftentimes contradictory requirements on the constitution of the foam stabilizer. Extensive investigations and experiments have therefore been carried out with a view to improving the characteristics and properties of the stabilizers, thereby to render them more flexible in respect to their possibility of application. It has thus been attempted for this purpose to vary the composition of the individual blocks, to alter the molecular weight and the molecular weight distribution, to arrange the blocks within the molecule in different ways and the like measures to obtain products of improved and more desirable properties. As a general proposition, it is extremely difficult to predict the specific properties which may result from changes or modifications which are made in the stabilizers since the specific constitution or composition of the stabilizer and its influence on the properties of the stabilizer do not follow any regular or predictable pattern. The phenomena that take place during the foaming procedure are so complex that their detailed theoretical interpretation is not possible at this stage. For this reason, a person skilled in this art is forced to depend on experimentation and to test empirical variation possibilities for the foam stabilizers. This task is rendered extremely difficult due to the fact that innumerable variation possibilities are theoretically feasible and even minor changes may sometimes result in unexpected and significant effects which contribute significantly to the foaming art.

It is a primary object of the present invention to provide polyoxyalkylene-polysiloxane mixed block polymers which fulfill the above requirements in a superior manner and whose use in foaming processes of the indicated kind renders the foaming process more desirable and results in foams of superior quality.

In accordance with the invention, it has been ascertained that these objects are fulfilled by using polyoxyalkylenepolysiloxane mixed block polymers whose polyoxyalkylene block consists of two distinct moieties, to wit, a first moiety or component constituting 25–70% by weight of the polyoxyalkylene block and having an average molecular weight of 1600–4000, preferably 1700–2500, and having an ethylene oxide content of 20–100% by weight, the remainder being propylene oxide or other higher alkylene oxides; and a second moiety or component constituting 30–75% by weight of the polyoxyalkylene block and having an average molecular weight of 400–1200, preferably 600–1000, this second component having an ethylene oxide content of 65–100% by weight, the remainder being propylene oxide or other higher alkylene oxides.

For the production of soft foams, polyoxyalkylene-polysiloxane mixed block polymers are preferred in which the polyoxy-alkylene block component with an average molecular weight of 1600–4000 contains 20–45% by weight of ethylene oxide By contrast, for the production of hard foams, those polyoxyalkylene-polysiloxane mixed block polymers are preferred whose polyoxyalkylene block component with an average molecular weight of 1600–4000 contains 50–100% by weight of ethylene oxide.

Particularly good results are obtained in the foaming if 2–20 polyoxyalkylene blocks are contained in the average mixed block polymer unit. The two different alkylene oxide units are advantageously mixed within each block in an approximately statistical manner. If the polyoxylalkylene blocks are linked to the polysiloxane blocks through an SiOC linkage, then the polyoxyalkylene block exhibits at the connecting point to the polysiloxane block preferably a propylene oxide unit. The polysiloxane blocks may be linear or branched. If they have linear structure, then advantageously 11–30 dimethylsiloxane units should be present in the average molecule. In respect to branched siloxane blocks, each trifunctional unit should preferably contain 3–10 dimethylsiloxane units in the average molecule. 5–8 such units in the average molecule are preferred. Other hydrocarbon groups, particularly other lower alkyl groups or OR groups may be attached to the silicon atom instead of methyl. The symbol R in the OR group should stand for hydrocarbon as, for example, methyl, ethyl, propyl or butyl. Other suitable hydrocarbon groups which may be attached to the silicon atom, particularly to the trifunctional silicon atom, are phenyl and vinyl.

The siloxane structure should advantageously have a narrow molecular weight distribution. If desired, it may be equilibrated during the preparation of the mixed block polymer, prior to reaction with the polyalkylene blocks.

The mixed block polymers to be used in the inventive process exhibit a distinctly improved stabilizing effect without, however, negatively affecting the cell opening effect in soft foams or the flow conditions in the preparation of hard foams.

In the followng formulae, which should be considered as average formulae, examples for the foam stabilizers In the following formulae, which should be considered as average formulae, examples for the foam stabilizers to be used in accordance with this invention are given in which the polyoxyalkylene blocks, in accordance with this invention, are composed of two different components of different molecular weight and, in some instances, of different ethylene oxide content.

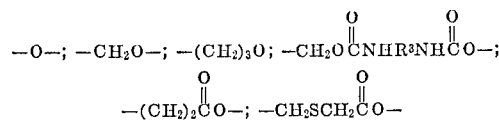
(I)

In the above Formula I, X stands for a polyoxyalkylene block of the formula $$[-C_nH_{2n}O]_mZ$$

wherein $n$ and $m$ are numbers whose magnitude is determined by the conditions as expressed in respect to the ethylene oxide content and the molecular weight. Symbol $n$ may thus be 2. The polyoxyalkylene block consists then exclusively of ethylene oxide units. The value of $n$, however, is increased if there is an additional amount of propylene oxide or perhaps other higher alkylene oxides present.

Z is a terminal substituent, preferably alkyl, aryl or acyl.

If M is oxygen, then a portion of the group X may consist of alkyl or trialkylsilyl. However, at the most 50% of all X groups may have this meaning.

M indicates the atom or the group which connects in conventional manner the polysiloxane block with the polyoxyalkylene block. Examples of such prior art connecting members are

$R^3$ is a divalent hydrocarbon which may be substituted. For example, $R^3$ may indicate 2,4-toluylene. Generally, however, other groups are also suitable which connect Si and X through oxygen attached to X.

The groups $R^1$ and $R^2$ stand for hydrocarbon, particularly a lower alkyl as, for example, methyl. The groups $R^1$ and $R^2$, however, may also have the same meaning as the group MX.

$R^3$ may be the same as $R^1$ or it may be

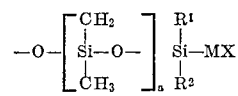

The symbol $a$ in the above formula is any number between 1 and 15, preferably 2 through 7, while $b$ is any number between 0 and 20, preferably 0–10.

Another structure which is an example of the inventive mixed block polymer is illustrated by Formula II

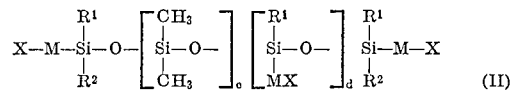
(II)

The substituents of Formula II have the same meaning as in Formula I. The symbol $c$ is a number between 10 and 200, while $d$ is a number from 1 through 30. The coefficient $c/d$ has a value of from 3 to 15, preferably 5 to 8.

The preparation of the block polymers to be used in accordance with the invention and, of course, also the compounds described in the examples may be effected according to processes well known in the art.

The invention will now be described by several examples, it being understood, however, that these examples are being given by way of illustration and not by way of limitation and that many changes may be effected without affecting in any way the scope and spirit of the invention as recited in the appended claims.

EXAMPLE 1

In a manner analogous to that described in U.S. Pat. 3,115,512, different polysiloxane-polyoxyalkylene mixed block polymers of the Formula I were prepared from equilibrated chlorosiloxanylsulfates. The starting substances can also be indicated by the Formula I, however, the group MX has then the meaning of —Cl and $(SO_4)_2$. The molar ratio of Cl: $(SO_4)_2$ is 3:1. The symbol $a$ has a value of 5.4; $b$ has a value of 2; M=—O—; $R^1=R^2=R^3=CH_3$; Z=—$C_4H_9$. Conforming to the teaching of U.S. Pat. 3,115,512, the chlorosiloxanylsulfates are reacted in toluene solution with polyethers of the Formula III under neutralization of the liberated acid by ammonia.

$$HO[-C_nH_{2n}O]_mC_4H_9 \quad \text{(III)}$$

The average values of $n$ and $m$ in Formula III are determined by the composition of the polyether further identified below. Within the polyoxyalkylene block, the ethylene oxide and the propylene oxide groups are present in quasi-statistical arrangement. This can, for example, be obtained thereby that two moles of an alkylene oxide are successively added on. The propylene oxide groups are on the average adjacent the OH group.

Per valence of —Cl or $(SO_4)_2$, there were used:

Substance A.—1.1 mole of the compound of Formula III with an average molecular weight of 802. The alkylene oxide block consisted of 15% by weight of propylene oxide and 85% by weight of ethylene oxide.

Substance B.—1.1 mole of the compound of Formula III with an average molecular weight of 3200. The alkylene oxide block consisted of 58% by weight of propylene oxide and 42% by weight of ethylene oxide.

Substance C.—0.55 mole of the compound of Formula III as described in respect to Substance A and 0.55 mole of the compound of Formula III as described in connection with Substance B.

It follows from the above that the average base formula for the substances A, B and C is

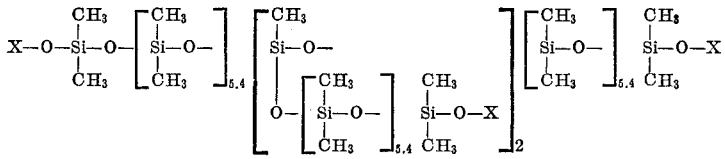

In substance A, the symbol X stands for

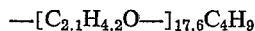

while in substance B, the symbol X stands for

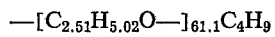

and the symbol X of substance C has the meaning

The testing of the foam stabilizers prepared in this manner was effected with a critical foam formulation as follows:

In each test, 300 parts of a polyether as it is commonly available on the market for the preparation of flexible urethane foams, containing in the average molecule 3 hydroxyl groups and having a molecular weight of 3500, were mixed under effective stirring with 15 parts of water, 30 parts of trichlorofluormethane, 1.5 parts of the respective foam stabilizers A, B or C (to wit, prepared with the polyoxyalkylene blocks A, B or C), 0.33 part of diethylenetriamine and 0.6 part of tin octoate. After adding 125 parts of toluylenediisocyanate (in isomeric mixture 2,4 and 2,6 in a ratio of 4:1), the reaction mixture was stirred with a blade stirrer for 7 seconds at 3000 r.p.m. The mixture was then poured into a box. In the test batch using the foam stabilizer C, a foam with fine pores having an open structure was formed. By contrast, when the foam stabilizers A and B were used, a complete collapse of the foam system was observed. When substances A and B were mixed, again no foam was obtained. This indicated the superior effect of the inventive stabilizers.

EXAMPLE 2

The following foam stabilizer was prepared:

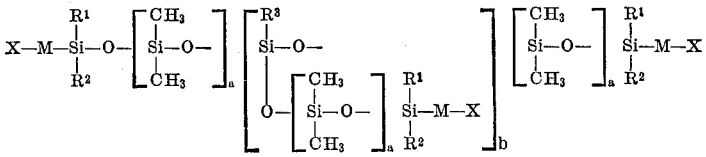

In this formula, $R^1=R^2=CH_3$; $R^3=C_2H_5$; $M=(CH_2)_3—O$; $X=60\%$ $[C_nH_{2n}O]_mC_4H_9$, molecular weight 750, ethylene oxide content 86% by weight, propylene oxide content 15% by weight and 40% of

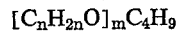

molecular weight 1820, ethylene oxide content 75% by weight, propylene oxide content 25% by weight; $a=2.5$; $b=5$.

The preparation was effected by reaction of an equilibrated siloxane of the same formula, wherein MX is hydrogen, with a corresponding mixture of polyethers of the formula

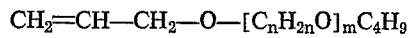

in the presence of pyridine-ethylene-PtCl$_2$ as catalyst in a manner well known in the art.

The foam stabilizer prepared in this manner was tested in several hard foam formulations with good success. Foam stabilizers which contain only one of the two polyoxyalkylene groups in the molecule are less effective in stabilizing the foaming mixture, particularly if the foaming is carried out in L-type molds.

What is claimed is:

1. In a process wherein a polyurethane foam is prepared by foaming a mixture of polyether having on the average at least two hydroxyl groups per molecule, organic diisocyanate, catalyst and water, in the presence of a foam stabilizer which is a polyoxyalkylene-polysiloxane mixed block polymer of the average formula

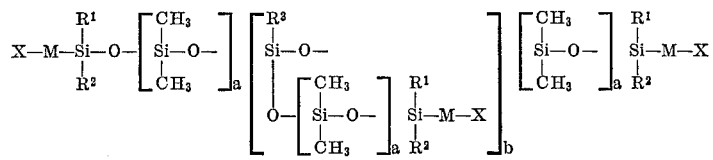

wherein X is a polyoxyalkylene block and M is a linking atom or group which connects the polysiloxane block with the polyoxyalkylene block and is one of $$-O-;\ -CH_2O-;\ -(CH_2)_3O-;\ -CH_2O\overset{O}{\underset{\|}{C}}NHR^3NH\overset{O}{\underset{\|}{C}}O-$$

$$-(CH_2)_2\overset{O}{\underset{\|}{C}}O-;\ or\ -CH_2S\ CH_2\overset{O}{\underset{\|}{C}}O-$$

$R^1$ and $R^2$ are lower alkyl, $R^3$ is divalent hydrocarbon or the same as $R^1$, or

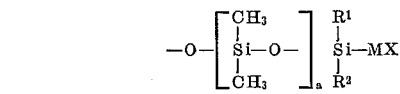

$a=1$ to 15, and
$b=0$ to 20, the improvement which comprises that a polyoxyalkylene-polysiloxane mixed block polymer is used whose polyoxyalkylene block X is essentially made up of a mixture of units A and B of the formula $[—C_nH_{2n}O]_mZ$, wherein Z is alkyl, aryl or acyl and the values of $n$ and $m$ are determined by the following conditions prevailing for units A and B:

Unit A: 25–70% by weight of polyoxyalkylene having an average molecular weight of 1600–4000 and having an oxyethylene content of 20–100% by weight, the remainder of the oxyalkylene content being oxypropylene, and Unit B: 30–75% by weight of polyoxyalkylene having an average molecular weight of 400–1200 and having an oxyethylene content of 65–100% by weight, the remainder of the oxyalkylene being oxypropylene.

2. The improvement as claimed in claim 1, wherein the polyoxyalkylene of unit A has an average molecular weight of 1700–2500.

3. The improvement as claimed in claim 1, wherein the average molecular weight of the polyoxyalkylene of unit B is between about 600 and about 1000.

4. The improvement as claimed in claim 1, for the production of soft foams, wherein the oxyethylene content of unit A is 20–45% by weight.

5. The improvement of claim 1, for the production of hard foams, wherein the oxyethylene content of unit A is 50–100% by weight.

6. The improvement of claim 1, wherein the mixed block polymer contains on the average 2–20 polyoxyalkylene blocks.

7. The improvement of claim 1, wherein the polysiloxane blocks are linear and contain 11–30 dimethylsiloxane units in the average molecule.

8. The improvement of claim 1, wherein the polysiloxane blocks are branched and contain per trifunctional unit 3–10 dimethylsiloxane units in the average molecule.

References Cited

UNITED STATES PATENTS

| | | | |
|---|---|---|---|
| 3,115,512 | 12/1963 | Rossmy et al. | 260—448.8 |
| 3,194,773 | 7/1965 | Hostettler | 260—2.5 |
| 3,272,762 | 9/1966 | Ibbotson et al. | 260—2.5 |
| 3,280,160 | 10/1966 | Bailey | 260—448.2 |
| 3,398,104 | 8/1968 | Haluska | 260—2.5 |
| 3,471,465 | 10/1969 | Loew | 260—2.5 |

DONALD E. CZAJA, Primary Examiner

H. S. COCKERAM, Assistant Examiner

U.S. Cl. X.R.

260—448.8